UNITED STATES PATENT OFFICE.

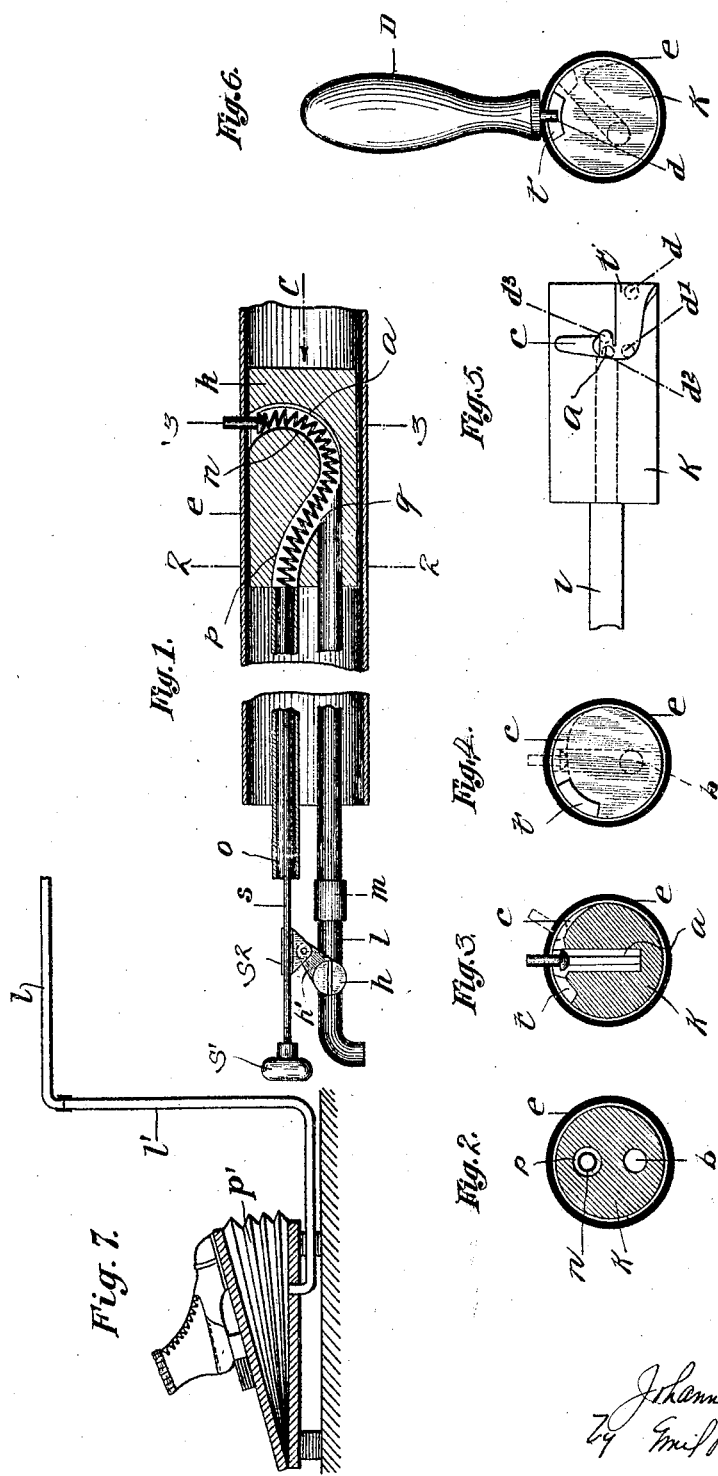

JOHANN SCHÜTTE, OF ZEESEN-KOENIGS-WUSTERHAUSEN, NEAR BERLIN, GERMANY, ASSIGNOR, BY MESNE ASSIGNMENTS, TO AMERICAN INVESTIGATION CORPORATION, OF NEW YORK, N. Y., A CORPORATION OF MARYLAND.

DEVICE FOR RIVETING TUBE JOINTS.

1,420,866.   Specification of Letters Patent.   Patented June 27, 1922.

Application filed July 14, 1919. Serial No. 310,873.

*To all whom it may concern:*

Be it known that I, JOHANN SCHÜTTE, naval architect, citizen of the German Republic, residing at Zeesen-Koenigs-Wusterhausen, near Berlin, Germany, have invented certain new and useful Improvements in a Device for Riveting Tube Joints, of which the following is a specification.

The present invention relates to a device the object of which is to allow the convenient riveting of tube joints such as will occur in making tubular girders for airships of the rigid type. With such tube joints both the joining of the several tubes forming the girder as also of the ties to such tubes by means of rivets afforded great difficulties owing to the fact that the respective tubes were all a closed section. These difficulties are obviated by the present invention.

The accompanying drawing illustrates in diagram a constructional form of the device according to the present invention.

Fig. 1 is a longitudinal sectional view of the device showing it in use.

Fig. 2 a transverse section on line 2—2.

Fig. 3 a transverse section on line 3—3 in Figure 1.

Fig. 4 a view of the device from the end in the direction of the arrow C in Figure 1, the tool being turned to bear against the head of the rivet.

Fig. 5 a top view of the head of the device.

Fig. 6 shows by means of a sectional view the mode of adjustment within the tube, and Fig. 7 is a diagrammatic representation of the pump for furnishing the compressed air.

The physical embodiment of this invention illustrated in Figs. 1 to 5 is constructed with a view to enabling the rivets to be placed in the rivet holes from the inside of the pipe, and further to permit this to be done without removing the tool from the pipe to be riveted. The tool comprises a head $k$ having certain parts hereinafter described, connected thereto and constituting a handle by means of which the tool is moved to proper position to insert the rivet in the hole provided in the pipe to be riveted. The head $k$ in the form shown is circular in a cross-section and substantially fits the circular pipe to be riveted.

To permit the rivet to be inserted in the rivet hole from the inside of the pipe without removing the tool from the pipe, the head $k$ is provided with a chute or passage $a$, which is connected with an opening $b$ in a tube $l$ secured to the head $k$ and serving as a handle for the tool.

The tube $l$ is provided with a chamber $m$ into which the rivet is placed stem forward to be moved by the action of compressed air entering the tube $l$, forwardly through the tube $l$ and the passage $a$ to the hole in the pipe $e$.

The passage $a$ is curved about a rather short radius, and therefore, when the rivet passes through said passage, the centrifugal force enables it to follow the proper course and to be accurately guided to the hole in the pipe. This operation merely places the rivet in the hole to be securely held in place by a further operation.

After the rivet is placed in the hole by the action of the compressed air, it is temporarily held there by a spring $n$ normally located in a tube $o$ secure to the head $k$ and having an opening communicating with passage $p$ formed in the head $k$. This passage $p$ merges with the passage $a$ for the rivets at $q$. When the rivet is being inserted, the spring $n$ is located to the rear of the point $q$ and is only brought into the passage $a$ after the rivet is in place. The spring $n$ is manipulated by means of a rod $s$ secure to one end thereof and extending through the tube $o$ and having a handle $s^1$ at one end. The spring $n$ being a coil spring is flexible and curves around the passage $p$ and $o$, when the rod $s$ is pushed inwardly. In addition to operating the spring $n$, the rod $s$ through suitable connection operates a valve $h$ in the tube $l$ to permit the compressed air to come into use, but the arrangement is such that the spring $n$ does not pass into the passage $a$ until the rivet has had an opportunity to precede the same. The connections between the rod $s$ and the valve $h$ comprise a block $s^2$ frictionally engaging the rod $s$ and an arm $h^1$ secured to the valve $h$ and pivotally connected to the block $s^2$.

In consequence of this arrangement the block $s^2$ is first moved by the operation of the rod $s$ and then the latter moves independently of the block to force the spring $n$ through the passages $p$ and $o$ to engage the rivet extending through the hole in the pipe $e$.

After the rivet is held by the spring $n$, the tool is rotated to cause the rivet head to engage a circumferential groove $c$ provided in the head $k$ contiguous with the passage $a$. The spring $n$ does not hold the rivet with its head flush against the inside of the pipe but merely at a level with the mouth of the groove C. The groove $c$, however, gradually diminishes in depth, and as the head is rotated the rivet gradually rides up the incline of the groove until its head is firmly held against the inner wall of the pipe $e$ to be riveted.

The tool is set to register with the hole in the pipe $e$ to be riveted by means of a member D having a stud $d$ adapted to enter the hole and project to the interior of the pipe. The tool is inserted, while the stud $d$ is in the hole, so that a wide groove $t$ on the head $k$ is encountered, by the stud as shown in Fig. 5. The tool is then further advanced to the position where the groove $t$ narrows and turns at a right angle. The tube is then rotated until the stud $d$ engages in the passage $a$ (position $d^2$ Fig. 5) whereupon it is withdrawn to position $d^3$, Fig. 5 in which position it is ready to receive the rivet. The member $d$ is then withdrawn from the hole and the tool operated as described to insert the rivet.

The compressed air for the tool may be furnished from a valveless foot-power pump $p$ shown in Fig. 7 which is connected by a flexible tube $l'$ or the like to the tube $l$. On its suction stroke, pump $p'$ draws in the required amount of air through the head $k$ and the tubes $l$, $l'$. If the air is sufficiently strong, the inflowing air carries with it any defective rivet and delivers it back to the chamber $m$. The latter can be provided with a rivet feeder which, since it is outside the tube can be of any desired size and easily applied.

It should be understood that auxiliary means other than compressed air may be used if desired.

What I claim is:

1. A device for riveting tube joints, comprising a rivet-holding head insertable in the tube and having a beveled rivet-supporting circumferential groove therein, said groove extending transversely.

2. A device for riveting tube joints, comprising a rivet-holding head insertable in the tube and having a beveled rivet-supporting groove therein; and a longitudinally extending elastic means for introducing the rivet into the rivet hole in the tube.

3. A device for riveting tube joints, comprising a rivet holding head insertable in the tube and having a beveled rivet-supporting groove therein, and means for supplying compressed air to the interior of the tube to introduce a rivet into the rivet hole in the tube.

4. A device for riveting tube joints, comprising a rivet-holding head insertable in the tube and having a beveled rivet-supporting groove therein; said head having a passage which opens into said groove; and means for supplying compressed air to said passage to introduce the rivet into the rivet hole in the tube.

5. A device for riveting tube joints, comprising a rivet-holding head insertable in the tube and having a beveled rivet-supporting groove therein; said head having a passage therein which is curved laterally and opens into said groove; a guide tube for the rivets opening into said passage; and means for forcing a rivet through said guide tube and said passage into the rivet hole in the first-named tube.

6. A device for riveting tube joints, comprising a rivet-holding head insertable in the tube and having a beveled rivet-supporting groove therein; said head having a passage therein which opens into said groove; a guide tube for the rivets opening into said passage; and means for forcing a rivet through said guide tube and said passage into the rivet hole in the first named tube.

7. A device for riveting tube joints, comprising a rivet-holding head insertable in the tube and having a beveled rivet-supporting groove therein; said head having a passage therein which opens into said groove; a guide tube for the rivets opening into said passage; means for forcing a rivet through said guide tube and said passage into the rivet hole in the first named tube; and a flexible push rod for holding the rivet in place in its hole.

8. A device for riveting tube joints, comprising a rivet-holding head insertable in the tube and having a beveled rivet-supporting groove therein, said head having a passage therein which opens into said groove; a guide tube for the rivets opening into said passage; a pipe connected to the guide tube for supplying compressed air thereto to force a rivet through said passage into the rivet hole in the first-named groove; a flexible push rod for holding the rivet in place in its tube; a cock for controlling the passage of the air through the guide tube; and a connection between the push rod and the cock for operating the latter simultaneously with the former.

9. A device for riveting tube joints, comprising a rivet-holding head insertable in the tube and having a beveled rivet-supporting groove therein, said head having a passage therein which opens into said groove; a guide tube for the rivets opening into said passage; a pipe connected to the guide tube for supplying compressed air thereto to force a rivet through said passage into the rivet hole in the first-named groove; and a pump connected to the air supply pipe and adapted to withdraw a defective rivet from said passage during its suction stroke.

10. A device for riveting tube joints, comprising a rivet-holding head insertable in the tube, and having a beveled rivet-supporting groove therein, said head having a passage therein which opens into said groove; a guide tube for the rivets opening into said passage; a pipe connected to the guide tube for applying compressed air thereto to force a rivet through said passage into the rivet hole in the first-named groove; a flexible push rod for holding the rivet in place in its hole; a cock for controlling the air supply; a connection between the push rod and the cock for operating the latter simultaneously with the former, and a pump connected to the air supply pipe and adapted to withdraw a defective rivet from said passage during its suction stroke.

In testimony whereof I have affixed my signature.

JOHANN SCHÜTTE.